United States Patent [19]

Dale et al.

[11] 3,980,985

[45] Sept. 14, 1976

[54] SUSPENSION SYSTEM FOR DIRECTIONAL HYDROPHONES

[75] Inventors: John R. Dale, Willow Grove; William F. Brenner, Chalfont; James F. McEachern, Hatboro, all of Pa.; Walter L. Leupold, Hadden Heights, N.J.; Edward A. McDemus, Ambler, Pa.

[73] Assignee: The United States of America as represented by the Secretary of the Navy, Washington, D.C.

[22] Filed: Apr. 1, 1974

[21] Appl. No.: 458,927

[52] U.S. Cl. .................... 340/8 S; 9/8 R; 340/13 R

[51] Int. Cl.² .................... H04B 13/00

[58] Field of Search .................. 340/2, 8 R, 8 S, 10, 340/12, 13; 9/8 R; 310/9, 1

[56] References Cited

UNITED STATES PATENTS

| | | | |
|---|---|---|---|
| 3,024,440 | 3/1962 | Pence | 340/8 S |
| 3,255,431 | 6/1966 | Howatt | 340/2 |
| 3,266,011 | 8/1966 | Massa | 340/8 R |
| 3,543,228 | 11/1970 | Farmer et al. | 340/2 |
| 3,720,909 | 3/1973 | Sikora | 340/8 R |
| 3,793,623 | 2/1974 | Gongwer | 340/8 S |

OTHER PUBLICATIONS

*Analytical Mechanics* Fowles Holt Rinehart and Winston, 1962 pp. 168, 169, 177 and 178.

*University Physics* Second Edition Sears et al. Addison-Wesley 1955, pp. 204–207.

*Primary Examiner*—Harold Tudor
*Attorney, Agent, or Firm*—R. S. Sciascia; Henry Hansen; Aaron Nerenberg

[57] ABSTRACT

A system for suspending a gradient hydrophone from a flotation member at the surface of a body of fluid by a single compliant member attached closely above the center of gravity of the hydrophone, in order to minimize the number of principal vibration modes, such as the rocking mode, and group the frequencies of such principal vibration modes in a band far enough below the operational acoustical bands of the hydrophone to allow effective electronic rolloff.

6 Claims, 2 Drawing Figures

SUSPENSION SYSTEM FOR DIRECTIONAL HYDROPHONES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of communications and more particularly to underwater acoustic transducers and suspension systems therefor.

Passive underwater surveillance devices measure acoustic signals which are higher in level than the background noise. Generally, higher signal to noise ratios produce greater detection capability of the acoustic device. Background noise consists of a summation of ambient acoustic noise and selfnoise generated by the device, including flow noise caused by water flow around the hydrophone envelope and motion noise caused by the surrounding wave and flow environment physically moving the acoustic device. When the particular device being used has an analysis band that extends down into the infrasonic frequency range, the contribution of motion noise can be many times greater than that of other background noise and can impose severe limitations on systems performance. This dominance is caused by multiple ringing vibrations at each natural frequency of the underdamped mechanical subsystem suspending the hydrophone. These vibration effects are exhibited as spurious bursts of ringing energy that are generally unpredictable as to level and time of occurrence. Before a repeating transfer function relating the noise to the environment can be formulated, the suspension design must be simplified to eliminate the major portion of spurious noise effects. Only after such simplification can the effect of the remaining background noise on system performance be assessed. Generally, existing hydrophone suspension designs consist of a plurality of compliant members attached at the top of a cylindrical pressure or gradient hydrophone. Directional gradient hydrophones are much more sensitive to acceleration due to low frequency motion than pressure hydrophones, and rocking mode vibrations ranging as high as 5 Hz present a complex noise problem at the low infrasonic operational frequency range of 10 Hz to 50 Hz of such hydrophones. The electronics associated with the directional gradient hydrophone is sensitive to signals of acoustic or mechanical origin down to less than ½ Hz, but the system rolloff is such that below 10 Hz system gain decreases rapidly, and at 1 Hz extraneous noise due to vibrational motion does not appreciably affect hydrophone performance. It is to be understood that the other existing modes of vibration (i.e., vertical and horizontal translation, and rotational) do not present a significant noise problem to the hydrophone, because their respective frequencies are normally at or below 1 Hz.

SUMMARY OF THE INVENTION

Accordingly, it is an object of the present invention to provide an improved, simplified, economical, reliable suspension system for a hydrophone for reducing spurious vibrational motion to an acceptable level. It is another object to provide a simplified hydrophone suspension system in order to reduce the complexity of all vibrational modes thus reducing background motion noise which interferes with the detection capability of the hydrophone. It is still another object to provide an improved hydrophone suspension system in order to group the frequencies of all vibrational modes, including the rocking mode, into a narrow, acceptable band in a region of relatively low electronic gain. It is yet a further object to provide an improved suspension system for a gradient type hydrophone to reduce spurious noise due to vibrational motion. Various other objects and advantages will appear from the following description of one embodiment of the invention, and the most novel features will be more particularly pointed out hereinafter in connection with the appended claims.

These and other objects are accomplished according to the present invention by apparatus comprising suspension means adapted to be attached to the hydrophone at a center of rotation for oscillation of the hydrophone thereabout at a desired predetermined frequency.

DESCRIPTION OF THE PREFERRED EMBODIMENT

Figure 1:
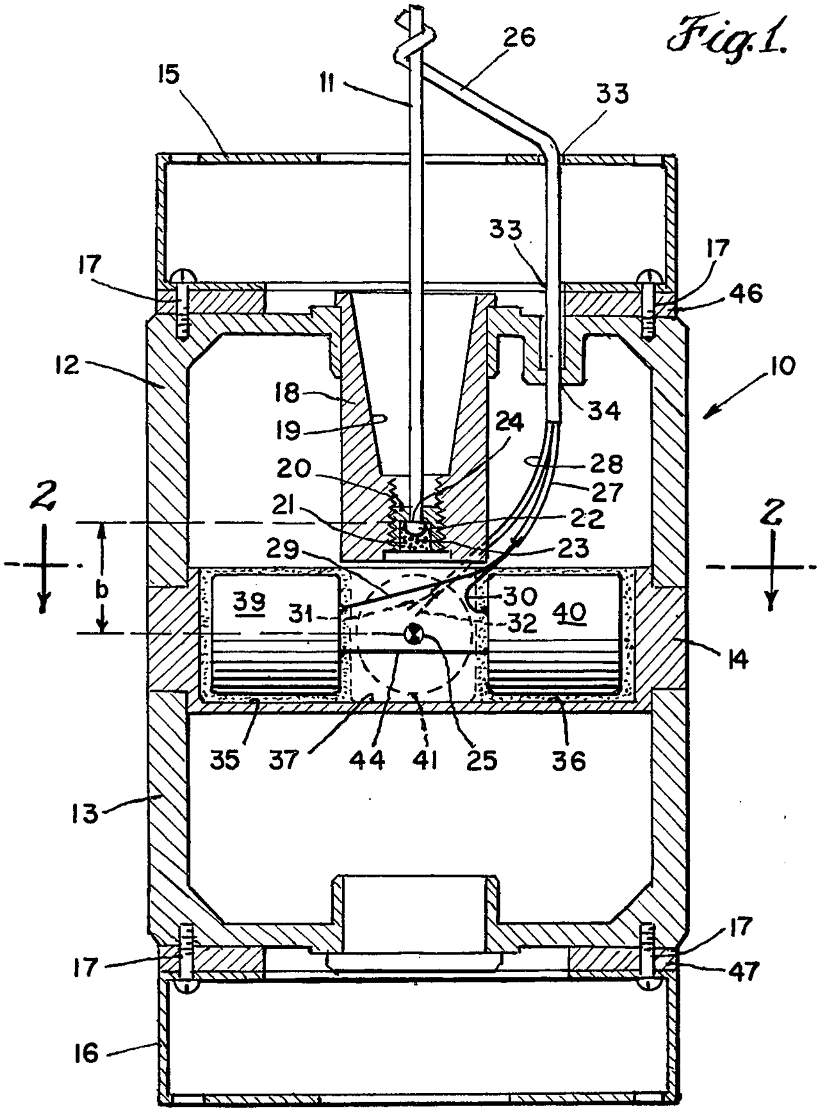
FIG. 1 is an elevational view partially in cross-section of a hydrophone and suspension system constructed according to the invention.

FIG. 1 illustrates an embodiment of the present invention in which a typical hydrophone assembly 10 is suspended by a compliant cable 11 from a flotation unit (not shown) located at the surface of a body of water. Hydrophone assembly 10, which is a passive, directional, gradient hydrophone, includes top and bottom cylindrical portions 12 and 13 surrounding a middle portion 14. It is to be understood that the present invention could be used with any type of hydrophone. Portions 12, 13 and 14 are joined in any suitable manner, such as by epoxy or any other suitable adhesive to form a rigid structure. Top and bottom end caps 15 and 16 are respectively fastened to top and bottom portions 12 and 13 by some convenient means, such as screws 17 to provide added projected area and mass as required. Weighted annular members 46 and 47 are respectively fastened between cap 15 and top portion 12, and cap 16 and bottom portion 13, as necessary, to produce neutral buoyancy of hydrophone assembly 10 in water. Top portion 12 contains an insert 18 secured near the top thereof and extending down toward middle portion 14. Insert 18 includes a tapered cavity 19 extending the entire length thereof, being generally wider at the top and narrower approaching middle portion 14. A threaded plug 20 having a cavity 21 therein is inserted into the end of insert 18 adjacent to middle portion 14. A knot 22 or other large mass is formed at the end of suspension cable 11 within cavity 21, which is filled with epoxy 23 or another suitable potting substance. Knot 22 must be large enough so that it remains contained within cavity 21 and cannot pull up through plug 20 and cavity 19 in insert 18. The upper portion of knot 22 bears against a surface 24, forming the upper surface of cavity 21. Surface 24 is the center of rotation about which hydrophone assembly 10 oscillates in a rocking mode of vibration, and is used for calculating distance b from the center of gravity 25 of hydrophone assembly 10 to the center of rotation. A signal cable 26 is wound around suspension cable 11 from the flotation unit (not shown) down to a point adjacent to the top of hydrophone assembly 10. Signal cable 26, which is typically a four conductor cable having two pairs 27 and 28 of two conductors each, 29 and 30, 31 and 32, respectively, extends into the interior portion of hydrophone assembly 10 through opening 33 in top end cap 15 and opening 34 in top portion 12.

Figure 2:
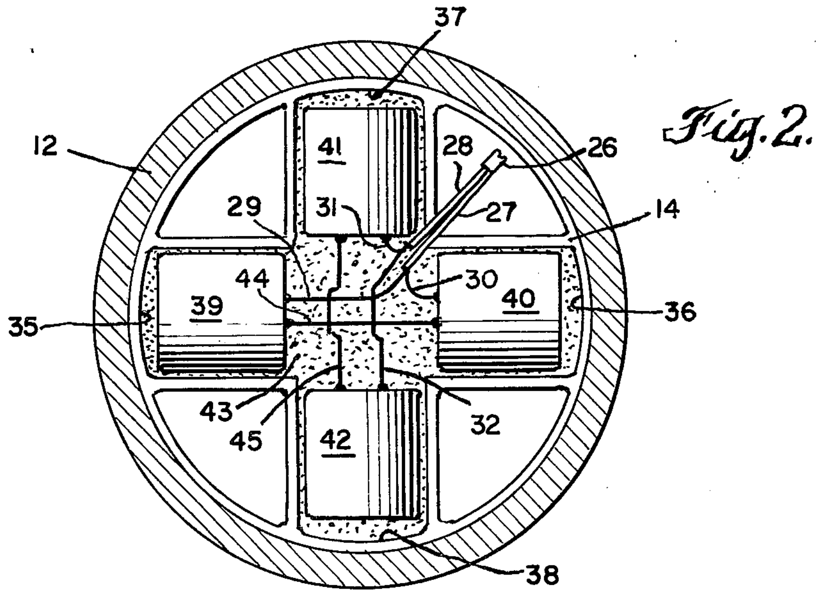
FIG. 2 is a partial cross-sectional view taken along the lines 2—2 of FIG. 1.

Referring now to FIGS. 1 and 2, middle portion 14 comprises two pairs of oppositely facing troughs 35 and 36, 37 and 38, each containing an acceleration-sensitive geophone 39, 40, 41 and 42. Each of the geophones is generally constructed of a magnet within a spring-mounted coil, but may typically be any acceleration-sensitive device for measuring directional motion due to acoustical vibration. Opposing pairs of geophones, 39 and 40, and 41 and 42 are respectively mounted in troughs 35, 36, 37 and 38 with their central axes co-linear, and then potted with epoxy 43 or other suitable potting material to keep them rigidly fixed in place relative to the remainder of rigid hydrophone assembly 10. Conductors 29 and 30 are connected to respective first terminals on geophones 39 and 40, whose respective second terminals are connected in common by a conductor 44 to complete the circuit. Conductors 31 and 32 are similarly connected to respective first terminals on geophones 41 and 42, whose respective second terminals are connected in common by a conductor 45 to complete the circuit. Geophones 39, 40, 41 and 42 are extremely sensitive to vibrational motion of frequencies down to ½ Hz to 1 Hz, necessitating a controlled reduction of all modes extraneous vibration for optimum hydrophone performance.

Calculation of distance $b$ from center of gravity 25 to surface 24 (i.e., center of rotation) is obtained by applying the frequency equation for a compound pendulum, $$f = \frac{1}{2\pi}\sqrt{\frac{mgb}{I}} \qquad (1)$$

where, $f$ = frequency of oscillation
$m$ = mass of hydrophone
$g$ = acceleration due to gravity
$b$ = distance from center of gravity to center of rotation
I = moment of inertia of hydrophone For example, using a design criteria of $f$ = 1 Hz, with a measured hydrophone assembly weight of 3.25 pounds and a calculated moment of inertia of 0.00515 lb. − ft$^2$, application of equation (1) yields a $b$ dimension of ¾ inch. In this manner, the effects of noise signals due to the rocking mode of vibrational motion are minimized by grouping all of the natural mechanical frequencies at or below 1 Hz, thus allowing effective electronic rolloff.

Having thus described the structure and design considerations of a preferred embodiment, some of the many advantages of applicants' present invention should now be readily apparent. The apparatus is simple and economical to construct from readily available, existing materials. By applying the compound pendulum frequency equation, natural mechanical frequency due to rocking mode vibration can be accurately controlled by locating the center of rotation a fixed distance from the center of gravity of the hydrophone assembly. Frequencies of all vibrational modes can thus be grouped into a narrow acceptable band in a region of relatively low electronic gain. Effectiveness of the extremely sensitive gradient hydrophone is thereby significantly increased by allowing essentially noise free listening within a desired infrasonic frequency band significantly above the noise frequency band.

Obviously, many modifications and variations of the present invention are possible in light of the above teachings. It is therefore to be understood that within the scope of the appended claims, the invention may be practiced otherwise than as specifically described.

What is claimed is:

1. Suspension apparatus comprising:
a hydrophone having a cavity extending from the outer surface thereof to the center of rotation, wherein the center of rotation is determined with respect to the center of gravity of said hydrophone according to the frequency equation for a compound pendulum; and
suspension means extending freely into said cavity and attached to said hydrophone at the center of rotation for oscillation of said hydrophone thereabout at a desired predetermined frequency.

2. A suspension system as set forth in claim 1 wherein the distance from the center of rotation to the center of gravity of the hydrophone is determined according to the equation, $$b = \frac{(2\pi f)^2 I}{mg}$$

where,
$b$ = distance from center of gravity of hydrophone to center of rotation
$f$ = frequency of oscillation
I = moment of inertia hydrophone
$m$ = mass of hydrophone
$g$ = acceleration due to gravity.

3. A suspension system as set forth in claim 1 wherein said suspension means includes an elongated compliant member.

4. A suspension system as set forth in claim 3 wherein the distance from the center of rotation to the center of gravity thereof is determined by the equation, $$b = \frac{(2\pi f)^2 I}{mg}$$

where,
$b$ = distance from center of gravity of hydrophone to the surface
$f$ = frequency of oscillation
I = moment of inertia of hydrophone
$m$ = mass of hydrophone
$g$ = acceleration due to gravity; and
said compliant member includes means at an end thereof for attachment at said center of rotation.

5. A suspension system as set forth in claim 4 wherein said hydrophone is directional.

6. A suspension system as set forth in claim 5 wherein said hydrophone is passive.

* * * * *